US006550972B1

United States Patent
Adolph et al.

(10) Patent No.: US 6,550,972 B1
(45) Date of Patent: Apr. 22, 2003

(54) TRANSPORT AND MOUNTING DEVICE FOR ROLLING ELEMENT SETS

(75) Inventors: Werner Adolph, Munich (DE); Rainer Wanjelik, Oberreichenbach (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/684,727

(22) Filed: Oct. 6, 2000

(30) Foreign Application Priority Data

Oct. 7, 1999 (DE) .......................................... 199 48 423

(51) Int. Cl.[7] ................................................. F16C 43/06
(52) U.S. Cl. ........................ 384/448; 384/559; 384/909
(58) Field of Search ................................. 384/510, 559, 384/909, 448; 29/898.061, 898.062

(56) References Cited

U.S. PATENT DOCUMENTS 2,312,615 A    3/1943  Allen
4,398,777 A  * 8/1983  Murphy ....................... 384/448

FOREIGN PATENT DOCUMENTS

| DE | 660435 | 5/1938 | |
|---|---|---|---|
| DE | 1842146 | 11/1961 | |
| DE | 2440717 | 3/1976 | |
| DE | 2815078 | 10/1979 | |
| DE | 3913343 | 10/1990 | |
| DE | 4126940 | 2/1993 | |
| FR | 956787 | * 3/1950 | ................. 384/559 |

* cited by examiner

*Primary Examiner*—William C Joyce
(74) *Attorney, Agent, or Firm*—Muserlian, Lucas and Mercanti

(57) ABSTRACT

A transport and mounting device for one or more sets of adjoining full complement cylindrical rolling elements which are disposed during transportation between an inner and an outer bushing arranged concentrically in each other, one end of each of the bushings comprising a retaining collar which is oppositely oriented to the retaining collar of the other bushing, the retaining collars of the device are arranged next to each other in axial direction and are in contact and in overlapping relationship with each other.

7 Claims, 3 Drawing Sheets

TRANSPORT AND MOUNTING DEVICE FOR ROLLING ELEMENT SETS

FIELD OF THE INVENTION

The invention concerns a transport and mounting device for one or more sets of adjoining full complement rolling elements which are disposed during transportation between an inner cylindrical bushing and an outer cylindrical bushing arranged concentrically in each other, one end of each of the inner and the outer cylindrical bushings comprising a retaining collar which is oppositely oriented to a retaining collar of the other of the inner and the outer cylindrical bushings.

BACKGROUND OF THE INVENTION

Transport and mounting devices of the pre-cited type have been known for quite a long time and are used when the manufacturer does not supply a complete rolling bearing but only a set of rolling elements which the buyer then installs in an existing bore for creating a rolling bearing. Such transport and mounting devices thus serve to retain the rolling elements in the correct position relative to one another during transport and to facilitate the insertion of the complete set of rolling elements into a suitable bore.

A transport and mounting device of the pre-cited type for needle rollers is known from DE-OS 28 15 078. According to FIG. 5 of this document, the device comprises an inner and an outer bushing which are arranged concentrically in each other and receive the needle rollers in the space defined between them. To form a secure transport assembly, the outer bushing and the inner bushing comprise an inward and an outward oriented flange respectively. In axial direction, these flanges are situated exactly above one another and are joined together by a positive snap connection.

A drawback of such a transport and mounting device is that, due to the snap connection of the flanges, close tolerances which increase the cost of the tools for manufacturing the device have to be kept. Besides this, it is only with some difficulty that the two bushings can be separated from each other and there is a risk of the snap lugs breaking off so that the entire assembly would become unusable.

OBJECTS OF THE INVENTION

It is therefore an object of the invention to provide a simple and thus economic transport and mounting device which eliminates the described drawbacks.

This and other objects and advantages of the invention will become obvious from the following detailed description.

SUMMARY OF THE INVENTION

The invention achieves the above objects by the fact that the retaining collars are arranged next to each other in axial direction while being in contact and in overlapping relationship with each other.

In this way, a simple and therefore economic transport and mounting device is created that retains the rolling elements reliably in the correct position relative to one another during transport and also permits an unproblematic insertion of the set or sets of rolling elements into the reception bore. Even after the removal of the inner bushing, the coordinated disposition of the rolling elements in the reception bore provides a secure hold therefor without a shaft or an inner bearing ring being inserted. For the purposes of the invention, by rolling elements is to be understood all types of rolling elements, i.e. not only, for example, cylindrical rollers, needle rollers, tapered rollers, convex rollers, but also balls. The adjoining and overlapping retaining collars enable the two bushings to be separated from each other in axial direction without great effort.

According to further features of the invention, the inner cylindrical bushing may have an axial dimension equal to, or smaller or larger than that of the outer cylindrical bushing. A smaller axial dimension of the inner bushing is particularly advantageous when several transport and mounting devices have to be stacked on one another for packaging. Tipping-over is thus excluded.

It is basically possible to make the bushings of any material that appears to be suitable. Advantageously, according to the invention, the bushings are made economically as plastic injection molded parts and at least the outer bushing is of a transparent plastic. This enables a visual control of the mounting operation during the insertion of the rolling element set into the reception.

According to still other features of the invention, it is advantageous in the case that more than one set of rolling elements are transported in the device, to arrange stop discs between the individual rolling element sets. These stop discs provide a clear separation between the rolling element sets and prevent the rolling elements from being displaced partially or completely out of one set into the other.

BRIEF DESCRIPTION OF THE DRAWINGS

The invention will now be described more closely with reference to the attached drawings in which FIGS. 1*a* and *b* are longitudinal cross-sections through a transport and mounting device of the invention.

DETAILED DESCRIPTION OF THE DRAWINGS

Figure 1A:
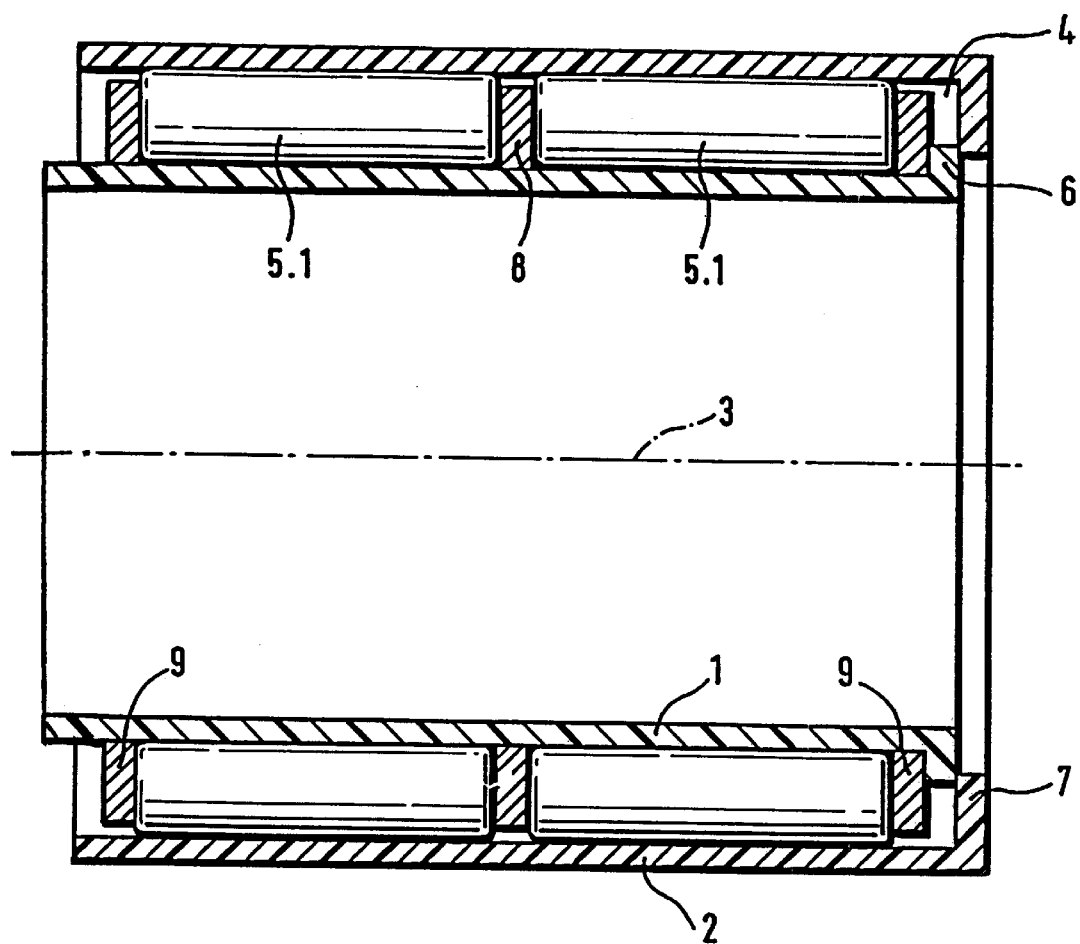
Figure 1B:
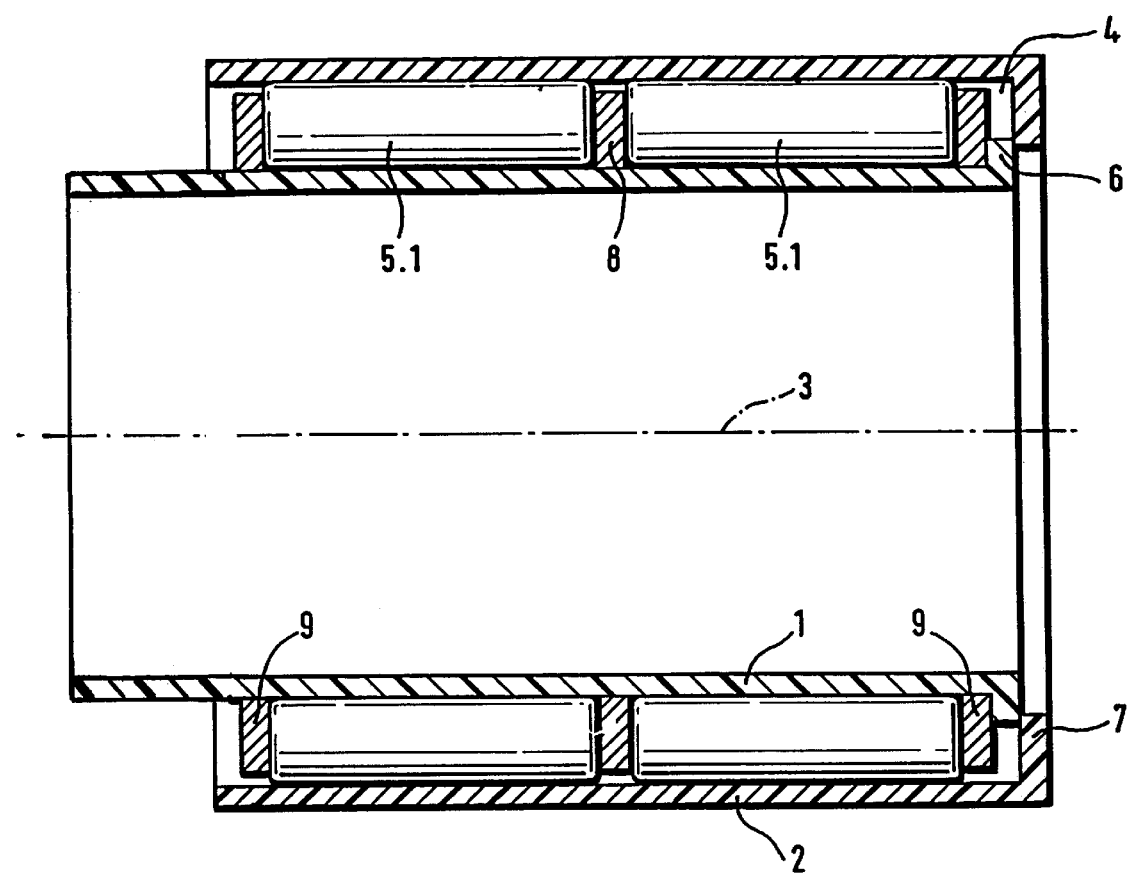

As shown in FIG. 1, the transport and mounting device of the invention comprises the inner bushing 1 and the outer bushing 2 which are arranged concentrically in each other about the axis 3. The inner bushing 1 comprises the radially outward oriented retaining collar 6 and the outer bushing 2 comprises the radially inward directed retaining collar 7. These retaining collars 6, 7 are arranged next to each other in axial direction, are in contact with each other and overlap each other in radial direction. This assures that the bushings 1, 2 can be separated from each other by axial displacement toward their open ends. Two rolling element sets 5 in the form of needle rollers 5.1 that are separated from each other by stop discs 8 are received in the space 4 defined between the bushings 1 and 2. At their opposite outer end faces, the needle roller sets 5 are limited by a stop disc 9 each. FIG. 1 further shows that when the retaining collars 6, 7 are in contact with each other, the axial extent of the inner bushing 1 is smaller than that of the outer bushing 2.

Figure 2:
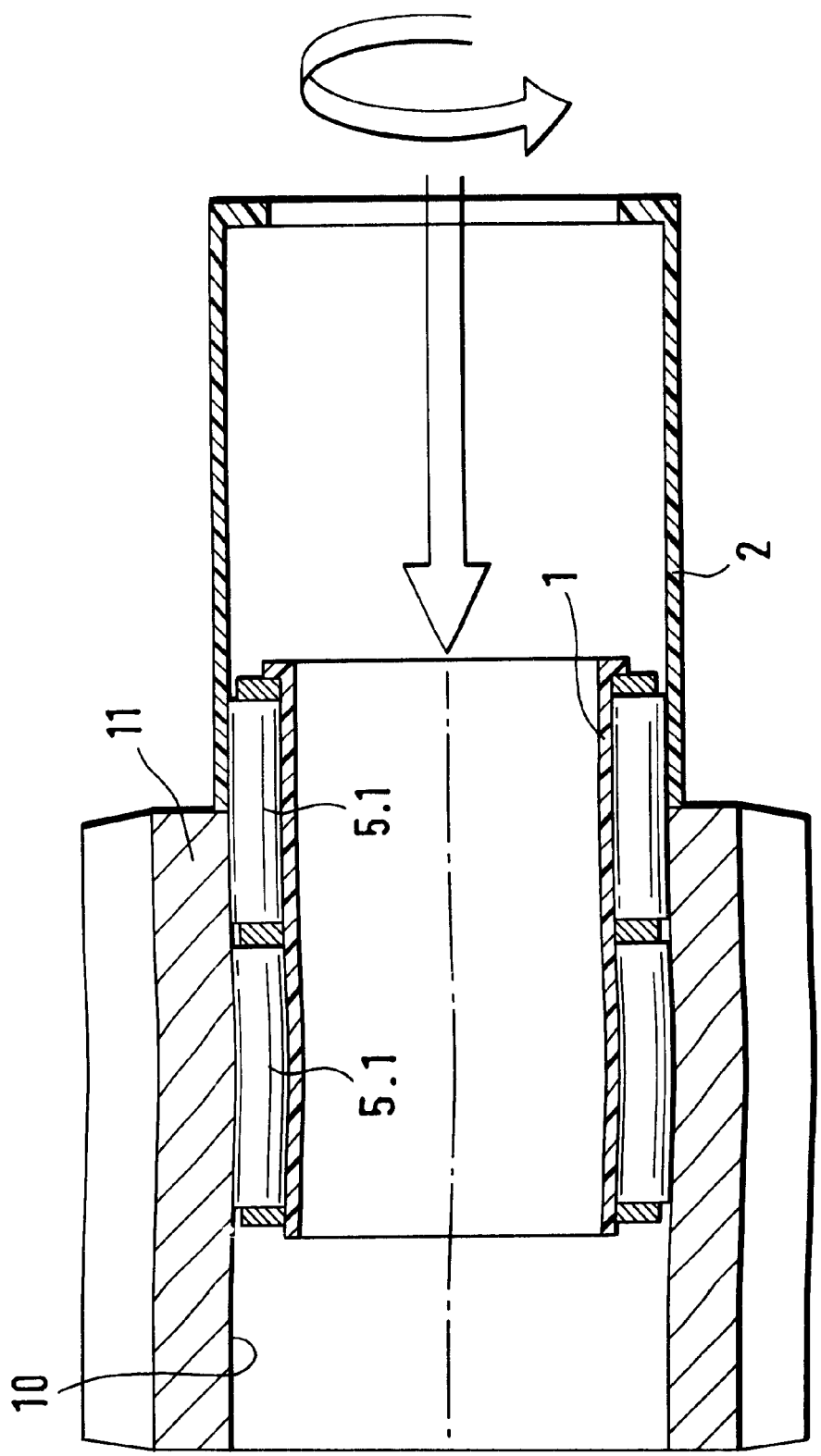
FIG. 2 shows the transport and mounting device of the invention during the insertion of the rolling element set into a reception bore.

FIG. 2 shows the transport and mounting device of FIG. 1 in the state in which the two adjoining sets of needle rollers 5.1 are being inserted into the reception bore 10 of the housing 11 which is configured as a planet gear. For this purpose, the entire assembly is at first pushed into the reception bore 10 till the end of the outer bushing 2 comes to abut against the housing 11. The bushings 1 and 2 are then separated from each other by application of further axial pressure on the inner bushing 1 in the direction following the first arrow. For better distribution of grease, the inner bushing 1 may be slightly turned during insertion as shown by the second arrow. After separation of the two bushings 1, 2, the needle rollers 5.1 together with the stop discs 8, 9 are pressed by the inner bushing 1 against the wall of the bore 10. To remove the inner bushing 1, a shaft or an inner bearing ring can be inserted through the bore 10 till its end comes to bear against the inner bushing 1 and presses the bushing 1, in the opposite direction of the arrow, out of the reception bore 10. It is naturally also possible to remove the inner bushing 1 manually without the help of a shaft or an inner bearing ring without the needle rollers leaving their coordinated positions, i.e. without their collapsing into the reception bore 10. On completion of the mounting operation, both the bushings 1, 2 are in perfect order for re-use.

What is claimed is:

1. A transport and mounting device for one or more sets of adjoining full complement rolling elements which are disposed during transportation between an inner cylindrical bushing and an outer cylindrical bushing arranged concentrically in each other, one end of each of the inner and the outer cylindrical bushings comprising a retaining collar which is oppositely oriented to a retaining collar of the other of the inner and the outer cylindrical bushings each retaining collar having a flat end surface extending along a plane perpendicular to the inner and outer cylindrical bushings, wherein the collars are offset in an axial direction and the end surfaces of each retaining collar engage one another.

2. A transport and mounting device of claim 1 wherein an axial dimension of the inner cylindrical bushing is equal to an axial dimension of the outer cylindrical bushing.

3. A transport and mounting device of claim 1 wherein an axial dimension of the inner cylindrical bushing is smaller than an axial dimension of the outer cylindrical bushing.

4. A transport and mounting device of claim 1 wherein an axial dimension of the inner cylindrical bushing is larger than an axial dimension of the outer cylindrical bushing.

5. A transport and mounting device of claim 1 wherein the inner and the outer cylindrical bushings are made as plastic injection molded parts, at least the outer cylindrical bushing being made of a transparent plastic.

6. A transport and mounting device of claim 1 wherein two adjacent sets of cylindrical rollers are separated from each other by a stop disc.

7. A transport and mounting device of claim 5 wherein two adjacent sets of cylindrical rollers bear by opposite outer end faces against stop discs.

* * * * *